(12) United States Patent
Haynes et al.

(10) Patent No.: US 11,097,848 B2
(45) Date of Patent: Aug. 24, 2021

(54) EVACUATION SLIDE HAVING EXTENDABLE DROPDOWN TUBE

(71) Applicant: GOODRICH CORPORATION, Charlotte, NC (US)

(72) Inventors: Timothy C. Haynes, Prescott Valley, AZ (US); Abel Sanchez, Mesa, AZ (US); Ana Adilene Esparza, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/923,432

(22) Filed: Jul. 8, 2020

(65) Prior Publication Data

US 2021/0009276 A1    Jan. 14, 2021

Related U.S. Application Data

(60) Provisional application No. 62/873,351, filed on Jul. 12, 2019.

(51) Int. Cl.
| | |
|---|---|
| *B64D 25/14* | (2006.01) |
| *B65G 11/10* | (2006.01) |
| *B64C 1/14* | (2006.01) |

(52) U.S. Cl.
CPC ............ *B64D 25/14* (2013.01); *B65G 11/10* (2013.01); *B64C 1/1461* (2013.01)

(58) Field of Classification Search
CPC ..... B65G 11/10; A62B 1/20; B63B 2027/145; B64D 25/14; B64C 1/1461

USPC .............. 193/25 B; 244/137.1, 137.2
See application file for complete search history.

(56) References Cited

U.S. PATENT DOCUMENTS

| | | | |
|---|---|---|---|
| 2,936,056 A | 5/1960 | Heyniger | |
| 3,554,344 A | 1/1971 | Summer et al. | |
| 4,460,062 A * | 7/1984 | Fisher ................... | B64D 25/14 182/48 |
| 5,875,868 A | 3/1999 | Smialowicz et al. | |
| 5,975,467 A * | 11/1999 | O'Donnell ............. | B64D 25/14 182/48 |
| 6,676,082 B2 | 1/2004 | Alberts | |
| 6,814,183 B2 | 11/2004 | Horvath et al. | |
| 7,090,168 B1 * | 8/2006 | Brown ................... | B64D 25/14 182/48 |
| 8,215,586 B2 * | 7/2012 | O'Donnell ............. | B64D 25/14 244/137.2 |
| 9,914,544 B2 * | 3/2018 | Hartman ............... | B64C 1/1461 |
| 2004/0118979 A1 * | 6/2004 | Moro ..................... | B64D 25/14 244/137.2 |
| 2019/0291881 A1 * | 9/2019 | Hartman ................ | B64D 25/14 |

* cited by examiner

*Primary Examiner* — James R Bidwell
(74) *Attorney, Agent, or Firm* — Snell & Wilmer L.L.P.

(57) ABSTRACT

An evacuation slide may comprise a sliding surface extending from a head end to a toe end of the evacuation slide. An extendable dropdown volume may be configured to increase a height of the sliding surface at the toe end of the evacuation slide. The extendable dropdown volume may be configured to remain in a stowed position at a first sill height and deploy at a second sill height greater than the first sill height.

18 Claims, 8 Drawing Sheets

EVACUATION SLIDE HAVING EXTENDABLE DROPDOWN TUBE

CROSS-REFERENCE TO RELATED APPLICATIONS

This application claims priority to and the benefit of U.S. Provisional Application No. 62/873,351, filed Jul. 12, 2019 and entitled "EVACUATION SLIDE HAVING EXTENDABLE DROPDOWN TUBE," which is incorporated herein by reference in its entirety.

FIELD

The present disclosure relates to aircraft evacuation systems and, in particular, to evacuation slides having an extendable dropdown volume.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. The inflatable evacuation slide should convey passengers safely and swiftly. As such, inflatable evacuation slides may typically be designed to produce a slide angle (i.e., an angle of the inclined slide relative to the ground surface) of between 25 degrees and 36 degrees for "normal" door sill height. However, adverse conditions such as aircraft tilt due to, for example, failed landing gear, may cause an increase in sill height. For example, a nose up aircraft tilt may produce a "high" sill condition at the forward exit doors, while a nose down aircraft tilt may produce a high sill condition at the aft exit doors. An exit door at high sill may lead to unsafe evacuation conditions, as a slide designed for evacuation at normal sill height may be too short for high sill and/or may form a steep slide angle, which can adversely affect evacuee safety.

SUMMARY

An evacuation slide is disclosed herein. In accordance with various embodiments, the evacuation slide may comprise a sliding surface, extending from a head end to a toe end of the evacuation slide, and an extendable dropdown volume configured to increase a height of the sliding surface at the toe end of the evacuation slide. The extendable dropdown volume may be configured to remain in a stowed position at a first sill height and deploy at a second sill height greater than the first sill height.

In various embodiments, a first rail may extend from the head end to the toe end of the evacuation slide. The first rail may include a first longitudinal tube, a second longitudinal tube, and a transverse tube extending between the first longitudinal tube and the second longitudinal tube.

In various embodiments, the extendable dropdown volume may be located in an interior of the transverse tube, when the extendable dropdown volume is in the stowed position. In various embodiments, the extendable dropdown volume may comprise an inflatable pillow configured to extend from a ground interface surface of the transverse tube.

In various embodiments, a first rail may extend from the head end to the toe end of the evacuation slide. A second rail may be configured to be oriented toward an exit surface, when the evacuation slide is in a deployed position. The extendable dropdown volume may extend from a toe of the second rail.

In various embodiments, the extendable dropdown volume may comprise at least one of an inflatable pillow or a U-shaped support. In various embodiments, a toe portion of the first rail may be located between the extendable dropdown volume and the toe end of the evacuation slide.

In various embodiments, a lace may be configured to secure the extendable dropdown volume in the stowed position. A measurement device may be in operable communication with the lace.

In various embodiments, a pin may be located through a loop formed by the lace and the measurement device may comprise a load and a chord operably coupled to the pin and the load.

In various embodiments, the measurement device may comprise a height sensor and an electromechanical actuator. The electromechanical actuator may be in operable communication with the lace and a controller of the height sensor.

An evacuation system is also disclosed herein. In accordance with various embodiments, the evacuation system may comprise a compressed fluid source and an evacuation slide fluidly coupled to the compressed fluid source. The evacuation slide may comprise a sliding surface, extending from a head end to a toe end of the evacuation slide, and an extendable dropdown volume configured to increase a height of the sliding surface at the toe end of the evacuation slide. The extendable dropdown volume may be configured to remain in a stowed position at a first sill height and deploy at a second sill height greater than the first sill height.

In various embodiments, the evacuation slide may further comprise a first rail extending from the head end to the toe end of the evacuation slide. The first rail may include a first longitudinal tube, a second longitudinal tube, and a transverse tube extending between the first longitudinal tube and the second longitudinal tube.

In various embodiments, the extendable dropdown volume may be located in an interior of the transverse tube, when the extendable dropdown volume is in the stowed position.

In various embodiments, a lace may be configured to secure a first segment of the transverse tube to a second segment of the transverse tube. In various embodiments, a measurement device may be in operable communication with the lace. The measurement device may be configured to determine at least one of an aircraft sill height, an aircraft pitch angle, an aircraft roll angle, or an angle of the sliding surface relative to vertical.

In various embodiments, a pin may be located through a loop formed by the lace. The measurement device may be configured to translate the pin out the loop.

An evacuation slide is also disclosed herein. In accordance with various embodiments, the evacuation slide may comprise a first rail, extending from a head end to a toe end of the evacuation slide, and a second rail configured to be oriented toward an exit surface, when the evacuation slide is in a deployed position. A sliding surface may extend from the head end to the toe end of the evacuation slide. An extendable dropdown volume may be coupled to at least one of the first rail or the second rail. The extendable dropdown volume may be configured to increase a height of the sliding surface at the toe end of the evacuation slide. The extendable dropdown volume may be configured to remain in a stowed position at a first sill height and deploy at a second sill height greater than the first sill height.

In various embodiments, a measurement device may be in operable communication with the extendable dropdown volume. The measurement device may be configured to determine at least one of an aircraft sill height, an aircraft pitch angle, an aircraft roll angle, or an angle of the sliding surface relative to vertical.

In various embodiments, a lace may be configured to secure the extendable dropdown volume in the stowed position. The measurement device may be configured to release the lace.

In various embodiments, the first rail may comprise a first longitudinal tube, a second longitudinal tube, and a transverse tube extending between the first longitudinal tube and the second longitudinal tube. The extendable dropdown volume may be configured to increase a diameter of the transverse tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity.

Evacuation systems of the present disclosure may include inflatable slides having an extendable dropdown volume. In various embodiments, the dropdown volume may be located at the toe end of the inflatable slide. The evacuation system may be configured such that the dropdown volume deploys in response to the aircraft being in a high still condition and remains stowed when the aircraft is at normal sill height. The dropdown volume may be configured to increase a distance between the ground and the sliding surface at the toe end of the evacuation slide. Increasing the distance between the ground and the sliding surface may decrease an angle of the sliding surface relative to the exit surface, which tends to reduce the risk of evacuee injury at high sill conditions.

Figure 1:
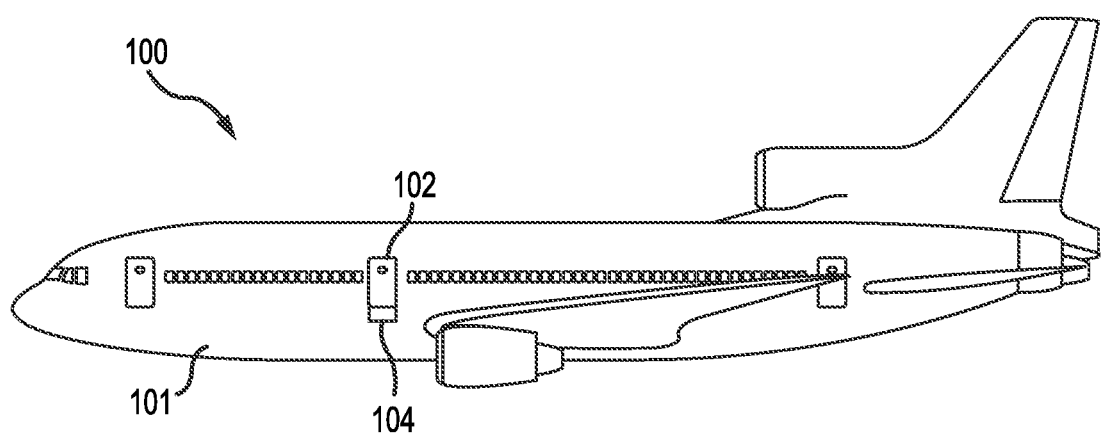
FIG. 1 illustrates an aircraft having an evacuation system, in accordance with various embodiments.

With reference to FIG. 1, an aircraft 100 is shown. Aircraft 100 may include a fuselage 101 having plurality of exit doors, including an exit door 102. Aircraft 100 may include one or more evacuation systems positioned near a corresponding exit door. For example, aircraft 100 includes an evacuation system 104 positioned near exit door 102. In the event of an emergency, exit door 102 may be opened by a passenger or crew member of aircraft 100. Evacuation system 104 may deploy in response to exit door 102 being opened and/or in response to an action taken by a passenger or crew member such as depression of a button or actuation of a lever. While evacuation system 104 is disclosed as deploying from exit door 102, it is further contemplated and understood that evacuation system 104 may deploy from other locations. For example, evacuation system 104 may deploy from a wing of aircraft 100.

Figure 2A:
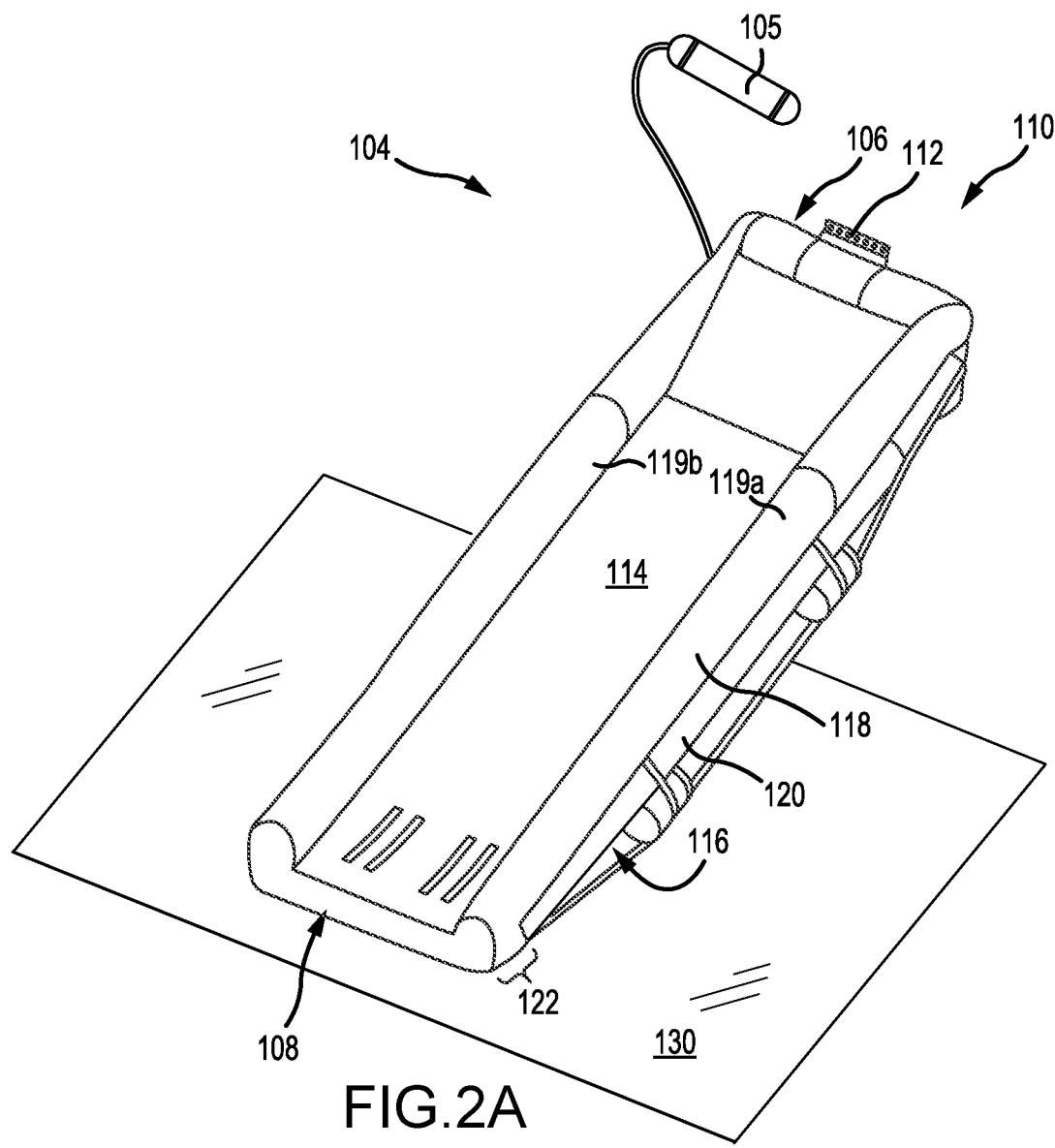
FIG. 2A illustrates a perspective view of an evacuation slide in an inflated state, in accordance with various embodiments.

With reference to FIG. 2A, evacuation system 104 is illustrated in a deployed position. In accordance with various embodiments, evacuation system 104 includes an inflatable evacuation slide 110. Evacuation slide 110 may be deployed from an aircraft, such as aircraft 100 in FIG. 1. Evacuation system 104 may further include a compressed fluid source 105. Fluid source 105 is fluidly coupled to evacuation slide 110. Compressed fluid source 105 may be configured to provide a pressurized gas to inflate evacuation slide 110.

Figure 2B:
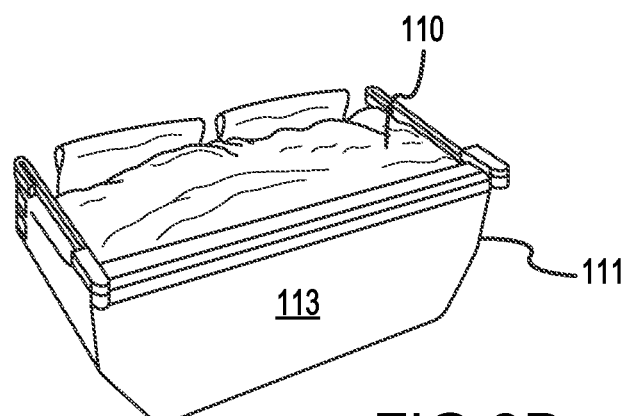
FIG. 2B illustrates a perspective view of an evacuation slide in a packed state, in accordance with various embodiments.

With reference to FIG. 2B, evacuation slide 110 is illustrated in a stowed or packed position. In various embodiments, evacuation slide 110 may be stowed in a packboard 111. Evacuation slide 110 may deploy from packboard 111 in response to the opening of an exit door, for example, exit door 102 in FIG. 1. In various embodiments, packboard 111 may include a blowout panel 113, which opens, or deploys, in response to deployment of evacuation slide 110. As discussed in further detail below, blowout panel 113 may be employed to determine an aircraft sill height and/or cause an extendable dropdown volume of evacuation slide 110 to deploy if the sill height is greater than a threshold sill height.

Returning to FIG. 2A, evacuation slide 110 includes a head end 106 and a toe end 108 opposite head end 106. Head end 106 may be coupled to an aircraft structure (e.g., a door sill) via a girt 112. Upon deployment of evacuation slide 110, toe end 108 translates away from the aircraft and door sill and contacts an exit surface 130 (e.g., the ground or water in the case of a water landing).

Evacuation slide 110 includes a sliding surface 114 and an underside surface 116 opposite sliding surface 114. Sliding surface 114 extends from head end 106 to toe end 108 of evacuation slide 110. During an evacuation event, underside surface 116 is oriented generally towards exit surface 130 and sliding surface 114 is oriented generally away from exit surface 130. Evacuation slide 110 includes a first (or upper) rail 118. First rail 118 may extend generally around a perimeter of sliding surface 114. In this regard, first rail 118 may define sliding surface 114. First rail 118 may include a first longitudinal tube 119a and a second longitudinal tube 119b. First and second longitudinal tubes 119a, 119b may each extend between head end 106 and toe end 108 of evacuation slide 110.

In various embodiments, evacuation slide 110 may further include a second (or lower) rail 120. During an evacuation event, second rail 120 may be located generally proximate (i.e., closer to) exit surface 130, as compared to first rail 118. Stated differently, when evacuation slide 110 is in a deployed position, second rail 120 may be located generally under first rail 118. First and second rails 118, 120 may comprise generally cylindrically shaped tubes. In various embodiments, first and second rails 118, 120 may be in fluid communication. For example, in various embodiments, first rail 118 and second rail 120 may be part of one, interconnected chamber that fills with gas in response to deployment of evacuation slide 110.

Figure 3A:
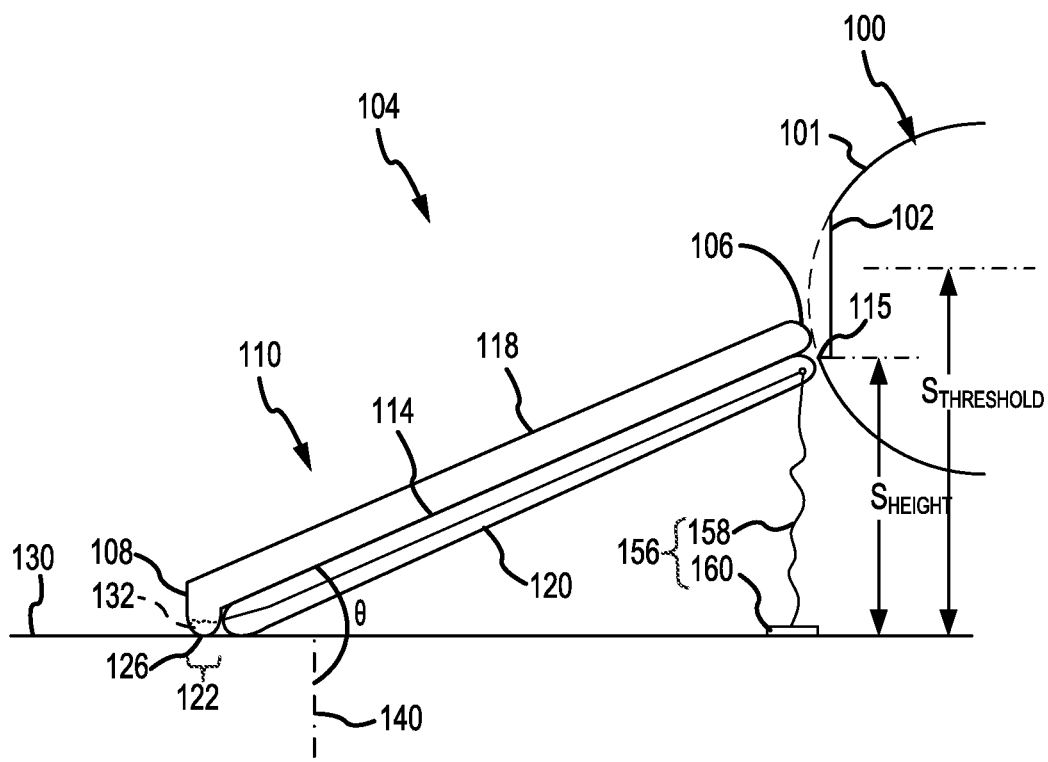
FIG. 3A illustrates a side view of an evacuation slide having an extendable dropdown volume in a stowed position, in accordance with various embodiments.
Figure 3B:
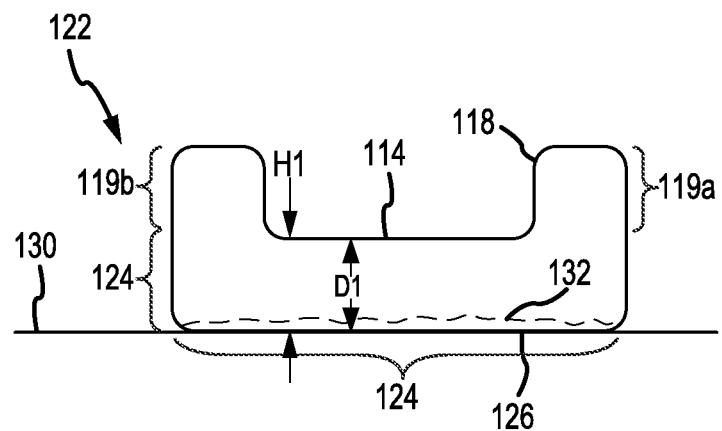
FIG. 3B illustrates the toe end of the evacuation slide of FIG. 3A, in accordance with various embodiments.

With reference to FIGS. 3A and 3B, evacuation slide 110 is illustrated in a deployed position, with aircraft 100 in a normal sill height condition. Head end 106 of evacuation slide 110 may be coupled proximate a door sill 115 of aircraft 100. Door sill 115 may form a lower portion of the threshold of fuselage 101. Evacuation slide 110 may be coupled to door sill 115 by girt 112, with momentary reference to FIG. 2A. In that regard, door sill 115, girt 112, and evacuation slide 110 may form a continuous exit path from fuselage 101.

In various embodiments, a toe portion 122 of first rail 118 is configured to contact exit surface 130. Toe portion 122 may be generally U-shaped. In this regard, toe portion 122 may comprise a transverse tube 124. Transverse tube 124 may extend between first longitudinal tube 119a and second longitudinal tube 119b of first rail 118. Transverse tube 124 may extend downward from first and second longitudinal tubes 119a, 119b (i.e., toward exit surface 130) such that transverse tube 124 is located between sliding surface 114 and exit surface 130. In various embodiments, toe portion 122 of first rail 118 is located between toe end 108 of evacuation slide 110 and second rail 120. In this regard, first and second longitudinal tubes 119a, 119b and transverse tube 124 of first rail 118 may define toe end 108 of evacuation slide 110. Toe portion 122 of first rail 118 is configured such that, upon deployment of evacuation slide 110, a ground interface surface 126 of toe portion 122 contacts exit surface 130.

In accordance with various embodiments, evacuation slide 110 includes an extendable dropdown volume 132. In FIGS. 3A and 3B, extendable dropdown volume 132 is illustrated in a stowed or uninflated position. Evacuation slide 110 may be configured such that in response to a sill height $S_{HEIGHT}$ of door sill 115 being less than a threshold sill height $S_{THRESHOLD}$ (i.e., when door sill 115 is at a normal sill height), extendable dropdown volume 132 remains in the stowed position. Sill height $S_{HEIGHT}$ of door sill 115 is measured vertically between door sill 115 and exit surface 130. As used herein, the terms "vertically" and "vertical" refer to the direction associated with gravity. In various embodiments, evacuation slide 110 may be configured such that extendable dropdown volume 132 will remain in the stowed position as long as an angle theta (θ) of evacuation slide 110 relative to vertical is less than a predetermined slide angle. Angle θ is measured between sliding surface 114 and an imaginary vertical plane 140.

In the stowed position, extendable dropdown volume 132 may be located within an internal volume of toe portion 122 of first rail 118. For example, extendable dropdown volume 132 may be located within an interior of transverse tube 124.

Figure 4A:
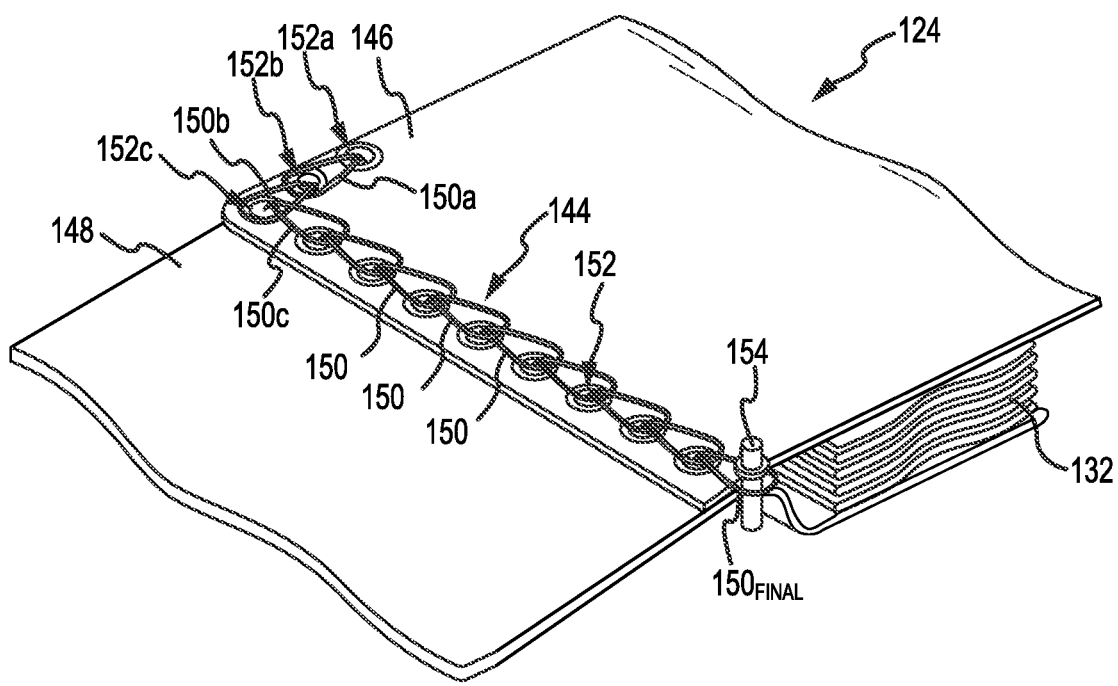
FIG. 4A illustrates an extendable dropdown volume in a secured position, in accordance with various embodiments.
Figure 4B:
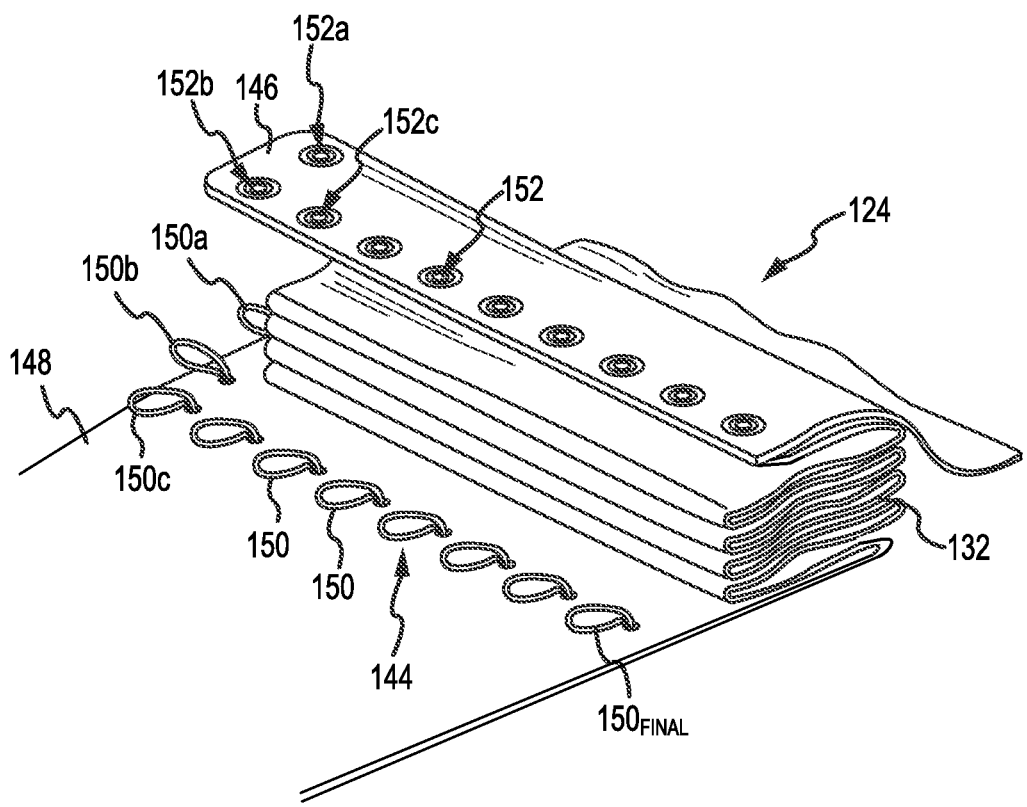
FIG. 4B illustrates an extendable dropdown volume in a released position, in accordance with various embodiments.

With reference to FIGS. 4A and 4B, in various embodiments, extendable dropdown volume 132 may be secured within transverse tube 124 via a lace 144. Lace 144 may secure a first segment 146 of transverse tube 124 to a second segment 148 of transverse tube 124. Lace 144 may close first and second segments 146, 148, thereby retaining extendable dropdown volume 132 in a stowed (i.e., uninflated) position. Securement of first segment 146 to second segment 148 is configured to prevent or block extendable dropdown volume 132 from deploying. In various embodiments, lace 144 may be in a daisy chain or speed lacing configuration. In this regard, lace 144 may be configured in a series of loops 150 with each loop extending through an opening 152 in first segment 146 and through an adjacent loop in the series. For example, a first loop 150a may extend through a first opening 152a and a second loop 150b may extend through a second opening 152b and through first loop 150a. A third loop 150c may extend through a third opening 152c and through second loop 150b, and so on. After a plurality of loops 150 have been threaded together in this manner, a pin 154 may close the daisy chain.

Pin 154 may be slidably coupled to lace 144 such that lace 144 unlaces in response to a removal, or an uncoupling, of pin 154 from lace 144. Pin 154 may be disposed in a retaining structure, for example, in a final or "key" loop $150_{FINAL}$ of the daisy chain formed by lace 144. Pin 154 being located in final loop $150_{FINAL}$ tends to prevent lace 144 from unfurling. Pulling (i.e., removing) pin 154 from final loop $150_{FINAL}$ releases lace 144, thereby allowing first and second segments 146, 148 to translate away from one another. Separation of first segment 146 from second segment 148 causes extendable dropdown volume 132 to deploy (i.e., inflate).

Figure 5A:
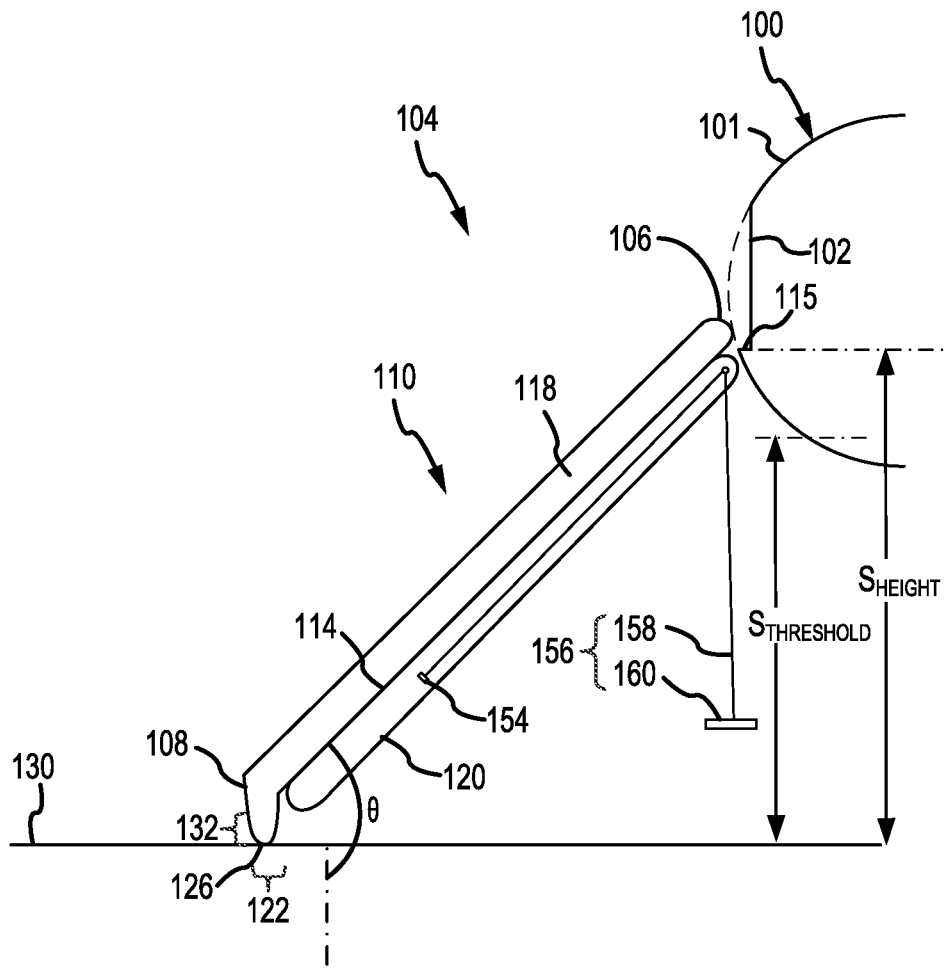
FIG. 5A illustrates a side view of an evacuation slide having an extendable dropdown volume in a deployed position, in accordance with various embodiments.
Figure 5B:
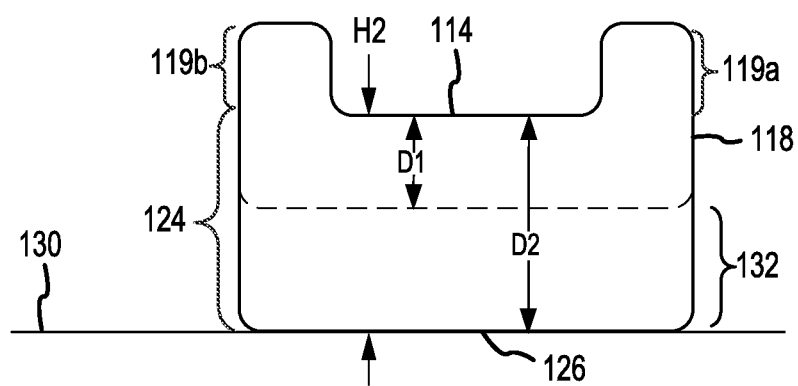
FIG. 5B illustrates the toe end of the evacuation slide of FIG. 5A, in accordance with various embodiments.

With reference to FIGS. 5A and 5B, evacuation slide 110 is illustrated with extendable dropdown volume 132 in the deployed or inflated position. In various embodiments, when extendable dropdown volume 132 is in the stowed position (FIGS. 3A and 3B), transverse tube 124 has a diameter, or width, D1 and when extendable dropdown volume 132 is in the deployed or inflated position (FIGS. 5A and 5B), transverse tube 124 has a diameter, or width, D2 that is greater than diameter D1. Deployment of extendable dropdown volume 132 may increase a height of sliding surface 114 relative exit surface 130. For example, when extendable dropdown volume 132 is in the stowed position (FIGS. 3A and 3B), sliding surface 114 is located at a height H1 relative to exit surface 130 and when extendable dropdown volume 132 is in the deployed or inflated position (FIGS. 5A and 5B), sliding surface 114 is located at a height H2 that is greater than height H1. Heights H1 and H2 may also be measured between ground interface surface 126 of toe portion 122 and sliding surface 114 at toe end 108. In various embodiments, toe portion 122 may be configured such that, upon deployment of extendable dropdown volume 132, extendable dropdown volume 132 defines ground interface surface 126 of toe portion 122. Increasing the height of sliding surface 114 at toe end 108 may decrease slide angle θ. In this regard, deployment of extendable dropdown volume 132 may decrease slide angle θ such that slide angle θ remains below a desired slide angle, even when the sill height $S_{HEIGHT}$ of door sill 115 is greater than threshold sill height $S_{THRESHOLD}$ (i.e., when door sill 115 is in a high sill condition). For example, extendable dropdown volume 132 may be configured such that slide angle θ, relative to vertical plane 140, is 130° or less, or 125° or less, or 120° or less, when extendable dropdown volume 132 is deployed.

With combined reference to FIG. 3A and FIG. 5A, in various embodiments, a measurement device 156 may be coupled to evacuation slide 110 and/or door sill 115. In various embodiments, measurement device 156 may be a mechanical, load-based measurement device. In this regard, measurement device 156 may comprise a load 160. A chord 158 of measurement device 156 may be coupled to load 160 and to pin 154, with momentary reference to FIG. 4A. Measurement device 156 may be configured to measure sill height $S_{HEIGHT}$ of door sill 115. Measurement device 156 may measure sill height $S_{HEIGHT}$ in a binary manner such that measurement device 156 determines whether sill height $S_{HEIGHT}$ is greater than threshold sill height $S_{THRESHOLD}$.

A length of chord 158 is selected such that if height $S_{HEIGHT}$ is less than threshold sill height $S_{THRESHOLD}$, then load 160 is supported by exit surface 130. Stated differently, load 160 reaching exit surface 130 indicates that sill height $S_{HEIGHT}$ is less than threshold sill height $S_{THRESHOLD}$. Exit surface 130 may support load 160 so the tension in chord 158 does not increase. For example, chord 158 may be configured such that if height $S_{HEIGHT}$ is less than threshold sill height $S_{THRESHOLD}$, then pin 154 remains in final loop $150_{FINAL}$ and extendable dropdown volume 132 remains deflated. Thus, measurement device 156 may not pull pin 154 or otherwise trigger deployment of extendable dropdown volume 132 in response to load 160 contacting exit surface 130.

In various embodiments, chord 158 may also be coupled to a pressure sensitive inflation regulator (e.g., a valve or switch) with a threshold sensitivity that is met in response to load 160 being suspended, but not met in response to load 160 being supported by the exit surface 130. Chord 158 may translate the valve or switch to allow inflation of extendable dropdown volume 132, in response to the height of door sill 115 being greater than threshold sill height $S_{THRESHOLD}$.

In various embodiments, load 160 may comprise a buoyant load configured to float in water. Load 160 may also be a multi-purposed load. For example, load 160 may be the slide canopy pouch, a first aid kit, a survival kit, a life preserver, a portion of the exit door, or another buoyant piece of flight equipment or an aircraft. In various embodiments, load 160 may be blowout panel 113 of packboard 111.

In various embodiments, chord 158 may comprise one or more segments of rope, cable, wire, lanyard, braiding, nylon webbing, and/or other suitable types of line, alone or in combination, extending a desired predetermined distance. Prior to deployment, measurement device 156 may be stored in a compartment of exit door 102 with evacuation slide 110. Chord 158 may be coiled and retained within the packboard 111 containing evacuation slide 110 or outside the packboard. Chord 158 may be released and uncoil in response to deployment of evacuation slide 110.

In FIG. 5A, evacuation slide 110 is shown with measurement device 156 suspended above exit surface 130, in accordance with various embodiments. In FIG. 5A, sill height $S_{HEIGHT}$ of door sill 115 is greater than threshold sill height $S_{THRESHOLD}$ (i.e., door sill 115 is in a high sill condition). A high sill condition may be a result of uneven terrain and/or a landing gear height, which increases the distance between door sill 115 and exit surface 130.

In various embodiments, when sill height $S_{HEIGHT}$ of door sill 115 is greater than threshold sill height $S_{THRESHOLD}$, load 160 may be suspended by chord 158 with chord 158 supporting load 160. Tension in chord 158 and the weight of load 160 suspended from evacuation slide 110 is configured to provide sufficient load to trigger deployment of extendable dropdown volume 132. For example, tension in chord 158 may translate pin 154 out final loop $150_{FINAL}$ (FIG. 4A), thereby allowing first segment 146 to separate from second segment 148 to deploy extendable dropdown volume 132.

Extendable dropdown volume 132 may decrease slide angle θ without increasing a longitudinal length of evacuation slide 110. As used herein, the term "longitudinal" refers to a direction extending from head end 106 to toe end 108. Decreasing slide angle θ without increasing a longitudinal length may allow evacuees to exit evacuation slide 110 safely and quickly.

Figure 6A:
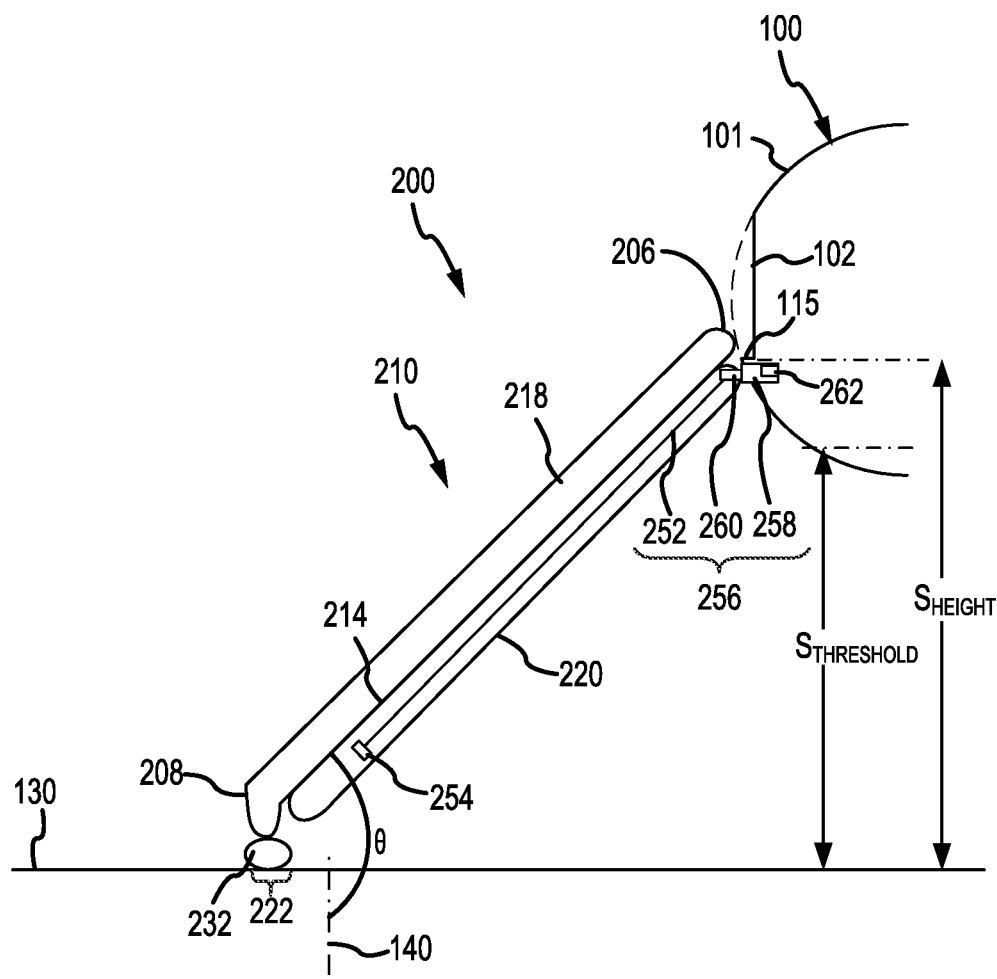
FIGS. 6A and 6B illustrate an evacuation slide with a pillow extendable dropdown volume in a deployed position, in accordance with various embodiments.
Figure 6B:
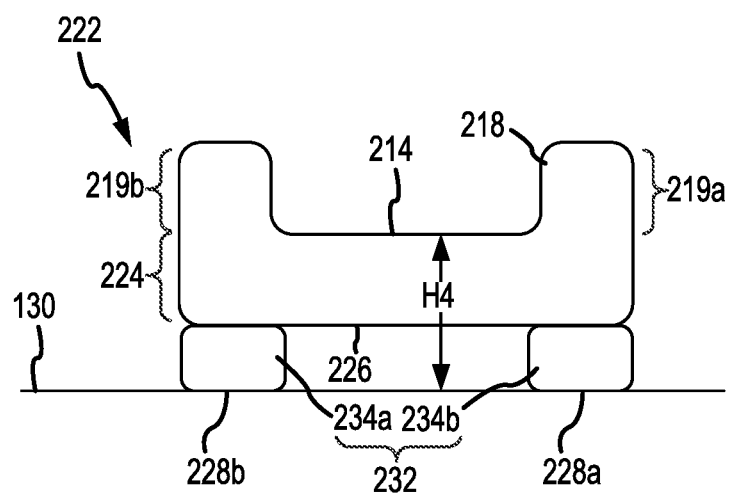
Figure 6C:
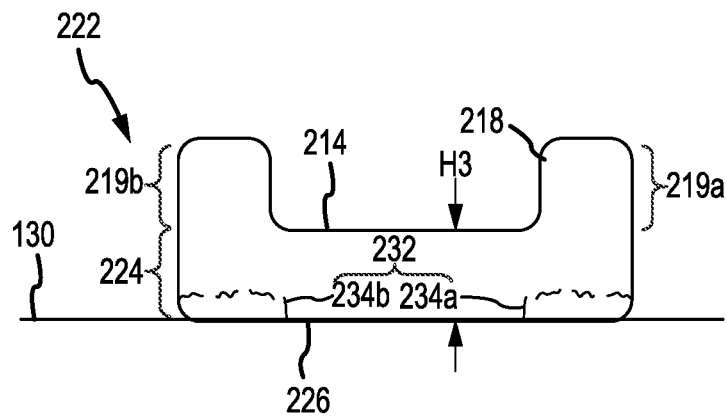
FIG. 6C illustrates an evacuation slide with a pillow extendable dropdown volume in a stowed position, in accordance with various embodiments.

Referring to FIGS. 6A, 6B and 6C, an evacuation system 200 is illustrated, in accordance with various embodiments. In various embodiments, aircraft 100 may include evacuation system 200 in place of evacuation system 104. Evacuation system 200 includes an inflatable evacuation slide 210, similar to inflatable evacuation slide 110 in FIG. 2A. Evacuation slide 210 includes a first (or upper) rail 218. In various embodiments, evacuation slide 210 may include a second (or lower) rail 220. Evacuation slide 210 includes a sliding surface 214 extending from a head end 206 of evacuation slide 210 to a toe end 208 of evacuation slide 210.

First rail 218 may include a first longitudinal tube 219a and a second longitudinal tube 219b. First and second longitudinal tubes 219a, 219b may each extend between head end 206 and toe end 208. First rail 218 further includes a toe portion 222. Toe portion 222 may be generally U-shaped. In this regard, toe portion 222 may comprise a transverse tube 224 extending between first longitudinal tube 219a and second longitudinal tube 219b. Transverse tube 224 may extend downward from first and second longitudinal tubes 219a, 219b (i.e., toward exit surface 130) such that transverse tube 224 is located between sliding surface 214 and exit surface 130.

In accordance with various embodiments, evacuation slide 210 includes an extendable dropdown volume 232. In various embodiments, extendable dropdown volume 232 comprises one or more inflatable pillows, such as for example, first inflatable pillow 234a and second inflatable pillow 234b. First and second pillows 234a, 234b may each comprise a generally cylindrical shape. First and second pillows 234a, 234b may be in fluid communication with first rail 218. In various embodiments, first and second pillows 234a, 234b may be fluidly coupled to transverse tube 224. In FIGS. 6A and 6B, extendable dropdown volume 232 is illustrated in a deployed or inflated position. Evacuation slide 210 may be configured such that extendable dropdown volume 232 deploys in response to a sill height $S_{HEIGHT}$ of door sill 115 being greater than a threshold sill height $S_{THRESHOLD}$ (i.e., when door sill 115 is at a high sill height).

In FIG. 6C, extendable dropdown volume 232 is illustrated in a stowed or uninflated position. Evacuation slide 210 may be configured such that when a sill height $S_{HEIGHT}$ of door sill 115 is less than threshold sill height $S_{THRESHOLD}$ (e.g., when door sill 115 is at or below normal sill height), extendable dropdown volume 232 will remain stowed. In the stowed position, extendable dropdown volume 232 may be located within an internal volume of toe portion 222 of first rail 218. For example, first and second pillows 234a, 234b may be folded within an interior of transverse tube 224. First and second pillows 234a, 234b may be each be secured within transverse tube 224 via a lace in a daisy chain formation, similar to lace 144 in FIG. 4A. When first and second pillows 234a, 234b are in the stowed position (FIG. 6C), a ground interface surface 226 of transverse tube 224 contacts exit surface 130. When first and second pillows 234a, 234b are in the deployed position (FIGS. 6A and 6B), a ground interface surface 228a of first pillow 234a and a ground interface surface 228b of second pillow 234b contact exit surface 130. In various embodiments, first and second pillows 234a, 234b are configured to extend from ground interface surface 226 of transverse tube 224 such that when the ground interface surface 228a and/or ground interface surface 228b contact exit surface 130, ground interface surface 226 of transverse tube 224 is raised off exit surface 130.

Deployment of extendable dropdown volume 232 may increase a height of sliding surface 214 relative exit surface 130. For example, when extendable dropdown volume 232 is in the stowed position (FIG. 6C), sliding surface 214 is located at a height H3 relative to exit surface 130 and when extendable dropdown volume 232 is in the deployed or inflated position (FIGS. 6A and 6B), sliding surface 214 is located at a height H4 that is greater than height H3. Height H3 may be measured between ground interface surface 226 of transverse tube 224 and sliding surface 214. Height H4 may be measured between ground interface surface 228a and/or ground interface surface 228b of inflatable dropdown volume 232 and sliding surface 214. Increasing the height of sliding surface 214 at toe end 208 may decrease slide angle θ. In this regard, deployment of extendable dropdown volume 232 may decrease slide angle θ such that slide angle θ remains below a desired slide angle when the sill height $S_{HEIGHT}$ of door sill 115 is greater than threshold sill height $S_{THRESHOLD}$ (i.e., when door sill 115 is in a high sill condition). For example, extendable dropdown volume 232 may be configured such that slide angle θ, relative to vertical plane 140, is 130° or less, or 125° or less, or 120° or less, when extendable dropdown volume 232 is deployed.

In accordance with various embodiments, a measurement device 256 may be coupled to evacuation slide 210 and/or door sill 115. In various embodiments, measurement device 256 may be a sensor-based measurement device. In this regard, measurement device 256 may comprise a height sensor 258. Height sensor 258 may be mounted in any suitable location in aircraft 100, such as in fuselage 101 or in a wing. Height sensor 258 may be mounted on or near door sill 115. Height sensor 258 may comprise any suitable apparatus for determining sill height $S_{HEIGHT}$, a pitch angle of aircraft 100, a roll angle of aircraft 100, and/or an angle of sliding surface 214 relative to vertical. In various embodiments, height sensor 258 may comprise an accelerometer, a solid state inclinometer, an optical or infrared distance measuring device, a mercury switch, or any other suitable sensor. Height sensor 258 may also include a controller 262 or other electronics configured to perform an action in response to the height and/or pitch and/or roll and/or angle determined by height sensor 258.

Controller 262 of height sensor 258 may comprise one or more processors configured to implement various logical operations in response to execution of instructions, for example, instructions stored on a non-transitory, tangible, computer-readable medium (also referred to as a non-transitory, tangible, computer-readable memory). The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Height sensor 258 may be configured to determine if sill height $S_{HEIGHT}$, and/or a pitch of aircraft 100, and/or a roll of aircraft 100, and/or slide angle θ exceeds a predetermined threshold (e.g., threshold sill height $S_{THRESHOLD}$, a threshold pitch, threshold roll, and/or a threshold angle θ). Controller 262 may be configured to take various actions, if sill height $S_{HEIGHT}$, and/or a pitch of aircraft 100 and/or a roll of aircraft 100 and/or slide angle θ exceeds its respective threshold. For example, controller 262 may be configured to command height sensor 258 to send an electronic signal to one or more electromechanical actuator(s) 260 of measurement device 256. Electromechanical actuator 260 is in operable communication with extendable dropdown volume 232. In various embodiments, electromechanical actuator 260 may be operationally coupled to a pin 254 via a chord 252. Pin 254 may be located through a lace configured to secure first pillow 234a, similar to pin 154 and lace 144 securing extendable dropdown volume 132 in FIG. 4A. In response to an electric signal from controller 262, electromechanical actuator 260 may translate chord 252 such that pin 254 is removed from the lace securing first pillow 234a in the stowed position. In response to removal of pin 254, first pillow 234a may deploy. In accordance with various embodiments, second pillow 234b may deploy in a similar manner (i.e., via translation of a pin coupled to an electromechanical actuator in operable communication with controller 262). In various embodiments, electromechanical actuator 260 may be in operable communication with a pyro-cutter configured to cut the lace securing first pillow 234a. In various embodiments, controller 262 may be configured to deploy either first pillow 234a or second pillow 234b, while the other of first pillow 234a and second pillow 234b remains in the stowed position. In various embodiments, evacuation slide 210 may include a mechanical, load-based measurement device, similar to measurement device 156 in FIGS. 3A and 5A. In various embodiments, evacuation slide 110, in FIGS. 3A and 5A, may include a sensor-based measurement device, similar to measurement device 256. Deployment of extendable dropdown volume 232 may decrease slide angle θ without increasing a longitudinal length of evacuation slide 210. Decreasing slide angle θ without increasing a longitudinal length may allow evacuees to exit evacuation slide 210 safely and quickly.

Figure 7:
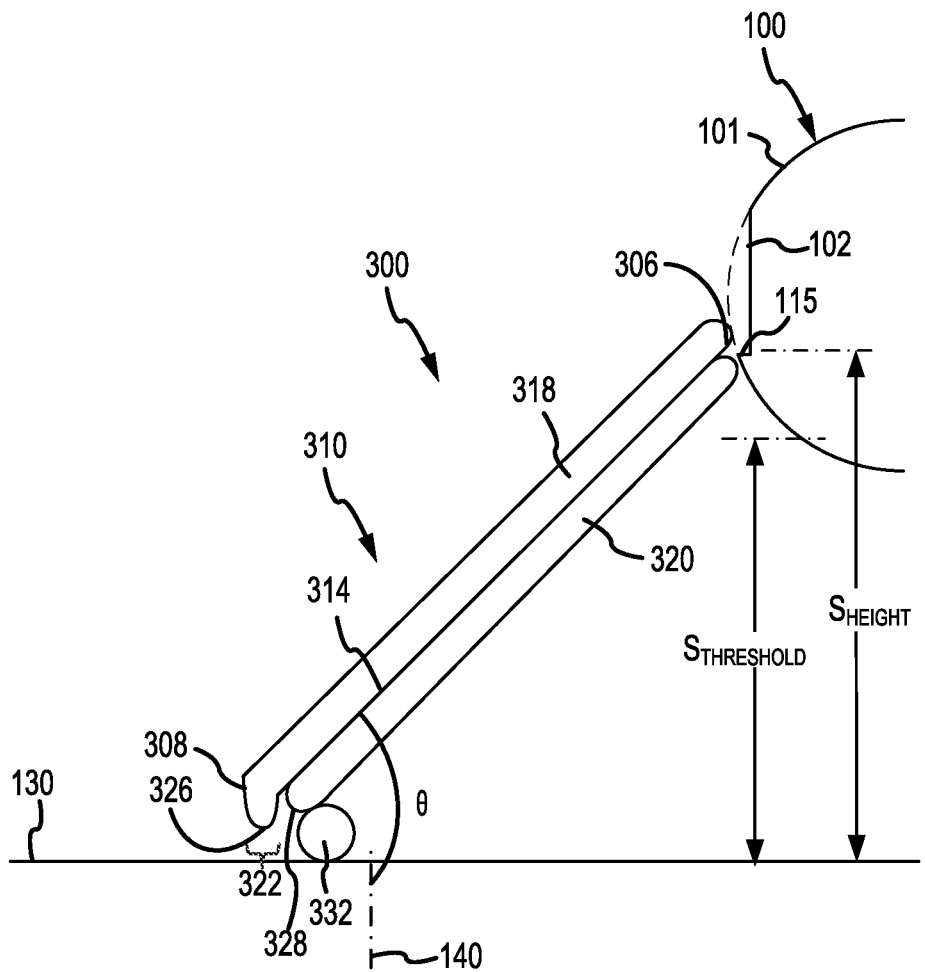
FIG. 7 illustrates an evacuation slide having a pillow extendable dropdown volume coupled to the toe of a lower slide rail, in accordance with various embodiments.

Referring to FIG. 7, an evacuation system 300 is illustrated, in accordance with various embodiments. In various embodiments, aircraft 100 may include evacuation system 300 in place of evacuation system 104. Evacuation system 300 includes an inflatable evacuation slide 310, similar to inflatable evacuation slide 110 in FIG. 2A. Evacuation slide 310 includes a first (or upper) rail 318 and a second (or lower) rail 320. Evacuation slide 310 includes a sliding surface 314 extending from a head end 306 of evacuation slide 310 to a toe end 308 of evacuation slide 310. First rail 318 includes a toe portion 322. Toe portion 322 may be generally U-shaped similar to toe portion 222 in FIGS. 6B and 6C.

In accordance with various embodiments, evacuation slide 310 includes an extendable dropdown volume 332. In various embodiments, extendable dropdown volume 332 comprises one or more inflatable pillows, similar to first and second pillows 234a, 234b in FIG. 6B. Extendable dropdown volume 332 may be in fluid communication with second rail 320. In various embodiments, extendable dropdown volume 332 may be fluidly coupled to and may extend from a toe 328 of second rail 320. In FIG. 7, extendable dropdown volume 332 is illustrated in a deployed or inflated position. Evacuation slide 310 may be configured such that extendable dropdown volume 332 deploys in response to a sill height $S_{HEIGHT}$ of door sill 115 being greater than a threshold sill height $S_{THRESHOLD}$ (i.e., in response to door sill 115 being at a high sill height).

Evacuation slide 310 may be further configured such that when a sill height $S_{HEIGHT}$ of door sill 115 is less than threshold sill height $S_{THRESHOLD}$ (e.g., when door sill 115 is at or below normal sill height), extendable dropdown volume 332 will remain stowed. In the stowed position, extendable dropdown volume 332 may be located within an internal volume at the toe 328 of second rail 320. For example, extendable dropdown volume 332 may be folded within an interior at second rail 320. In various embodiments, extendable dropdown volume 332 may be secured within second rail via a lace in a daisy chain formation, similar to lace 144 in FIG. 4A.

Deployment of extendable dropdown volume 332 may increase a height of sliding surface 314 relative exit surface 130. Increasing the height of sliding surface 314 at toe end 308 may decrease slide angle θ. In this regard, deployment of extendable dropdown volume 332 may decrease slide angle θ such that slide angle θ remains below a desired slide angle when the sill height $S_{HEIGHT}$ of door sill 115 is greater than threshold sill height $S_{THRESHOLD}$ (i.e., in response to door sill 115 being in in a high sill condition). For example, extendable dropdown volume 332 may be configured such that slide angle θ, relative to vertical plane 140, is 130° or less, or 125° or less, or 120° or less, when extendable dropdown volume 332 is deployed. In response to evacuation slide 310 being at normal sill height (i.e., when sill height $S_{HEIGHT}$ of door sill 115 is less than a threshold sill height $S_{THRESHOLD}$), a ground interface surface 326 of toe portion 322 may contact exit surface 130. Deployment of extendable dropdown volume 332 may cause ground interface surface 326 to raise off exit surface 130.

In various embodiments, extendable dropdown volume 332 is in operable communication with a measurement device, similar to measurement device 156 in FIGS. 3A and 5A or measurement device 256 in FIG. 6A. Stated differently, evacuation slide 310 may include a measurement device configured to determine if sill height $S_{HEIGHT}$ is greater than threshold sill height $S_{THRESHOLD}$ and deploy extendable dropdown volume 332 in response to sill height $S_{HEIGHT}$ exceeding the threshold sill height $S_{THRESHOLD}$.

Deployment of extendable dropdown volume 332 may decrease slide angle θ without increasing a longitudinal length of evacuation slide 310. Decreasing slide angle θ without increasing a longitudinal length may allow evacuees to exit evacuation slide 310 safely and quickly.

Figure 8A:
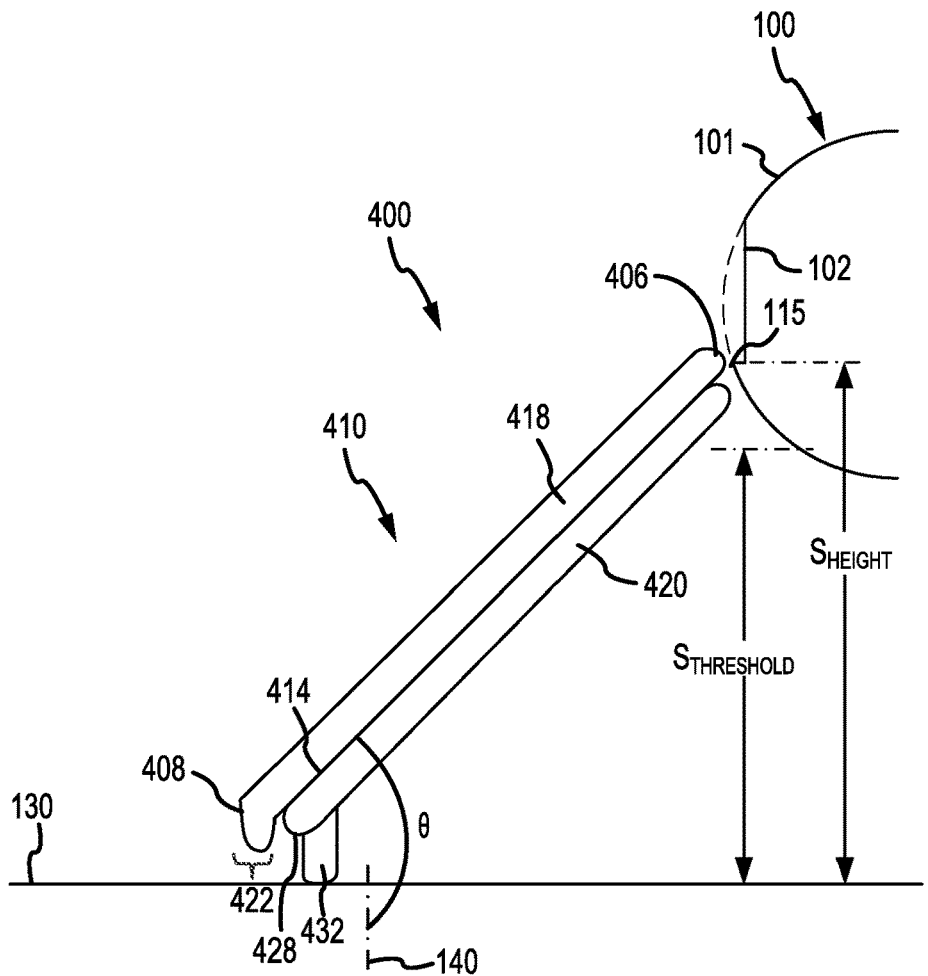
FIGS. 8A and 8B illustrate an evacuation slide having an extendable support dropdown volume in a deployed position, in accordance with various embodiments.
Figure 8B:
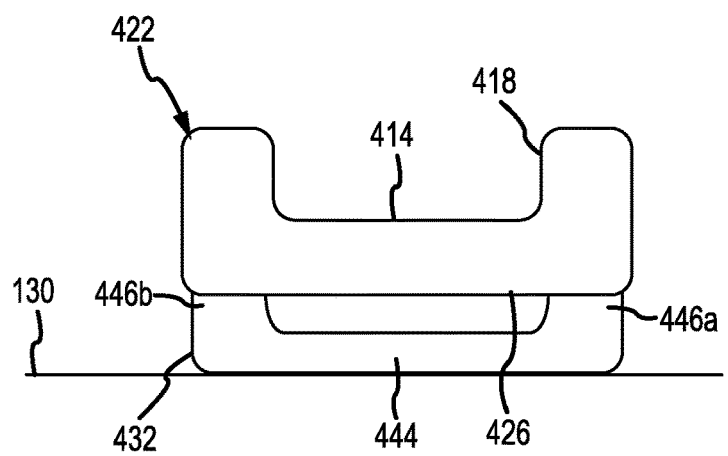

Referring to FIGS. 8A and 8B, an evacuation system 400 is illustrated, in accordance with various embodiments. In various embodiments, aircraft 100 may include evacuation system 400 in place of evacuation system 104. Evacuation system 400 includes an inflatable evacuation slide 410, similar to inflatable evacuation slide 110 in FIG. 2A. Evacuation slide 410 includes a first (or upper) rail 418 and a second (or lower) rail 420. Evacuation slide 410 includes a sliding surface 414 extending from a head end 406 of evacuation slide 410 to a toe end 408 of evacuation slide 410. First rail 418 includes a toe portion 422. Toe portion 422 may be generally U-shaped, similar to toe portion 222 in FIGS. 6B and 6C.

In accordance with various embodiments, evacuation slide 410 includes an extendable dropdown volume 432. In various embodiments, extendable dropdown volume 432 comprises a U-shaped support. In this regard, extendable dropdown volume 432 may comprise a transverse tube 444, a first vertical tube 446a, and a second vertical tube 446b. Transverse tube 444 may extend between first vertical tube 446a and second vertical tube 446b. First and second vertical tubes 446a, 446b extend between transverse tube 444 and second rail 420. In various embodiments, toe portion 422 of first rail 418 is located between toe end 408 of evacuation slide 410 and extendable dropdown volume 432.

Extendable dropdown volume 432 may be in fluid communication with second rail 420. In various embodiments, extendable dropdown volume 432 may be fluidly coupled to and may extend from a toe 428 of second rail 420. In FIGS. 8A and 8B, extendable dropdown volume 432 is illustrated in a deployed or inflated position. Evacuation slide 410 may be configured such that when a sill height $S_{HEIGHT}$ of door sill 115 is greater than a threshold sill height $S_{THRESHOLD}$ (i.e., when door sill 115 is at a high sill height), extendable dropdown volume 432 will deploy.

Evacuation slide 410 may be further configured such that when a sill height $S_{HEIGHT}$ of door sill 115 is less than threshold sill height $S_{THRESHOLD}$ (e.g., when door sill 115 is at or below normal sill height), extendable dropdown volume 432 will remain stowed. In the stowed position, extendable dropdown volume 432 may be located within an internal volume at the toe 428 of second rail 420. For example, extendable dropdown volume 432 may be folded within an interior at second rail 420. In various embodiments, extendable dropdown volume 432 may be secured within second rail 420 via a lace in a daisy chain formation, similar to lace 144 in FIG. 4A.

Deployment of extendable dropdown volume 432 may increase a height of sliding surface 414 relative exit surface 130. Increasing the height of sliding surface 414 at toe end 408 may decrease slide angle θ. In this regard, deployment of extendable dropdown volume 432 may decrease slide angle θ such that slide angle θ remains below a desired slide angle when the sill height $S_{HEIGHT}$ of door sill 115 is greater than threshold sill height $S_{THRESHOLD}$ (i.e., when door sill 115 is in a high sill condition). For example, extendable dropdown volume 432 may be configured such that slide angle θ, relative to vertical plane 140, is 130° or less, or 125° or less, or 120° or less, when extendable dropdown volume 432 is deployed. When evacuation slide 410 is at normal sill height (i.e., when sill height $S_{HEIGHT}$ of door sill 115 is less than a threshold sill height $S_{THRESHOLD}$), a ground interface surface 426 of toe portion 422 may contact exit surface 130. When extendable dropdown volume 432 is deployed, ground interface surface 426 may be raised off exit surface 130.

In various embodiments, extendable dropdown volume 432 is in operable communication with a measurement device, similar to measurement device 156 in FIGS. 3A and 5A or measurement device 256 in FIG. 6A. Stated differently, evacuation slide 410 may include a measurement device configured to determine if sill height $S_{HEIGHT}$ is greater than threshold sill height $S_{THRESHOLD}$ and deploy extendable dropdown volume 432 in response to sill height $S_{HEIGHT}$ exceeding threshold sill height $S_{THRESHOLD}$.

Deployment of extendable dropdown volume 432 may decrease slide angle θ without increasing a longitudinal length of evacuation slide 410. Decreasing slide angle θ without increasing a longitudinal length may allow evacuees to exit evacuation slide 410 safely and quickly.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
    a sliding surface extending from a head end to a toe end of the evacuation slide; and
    an extendable dropdown volume configured to increase a height of the sliding surface at the toe end of the evacuation slide, wherein the extendable dropdown volume is configured to remain in a stowed position at a first sill height and deploy at a second sill height greater than the first sill height, and wherein the extendable dropdown volume is configured to decrease a slide angle of the evacuation slide without increasing a longitudinal length of the evacuation slide.

2. The evacuation slide claim 1, further comprising a first rail extending from the head end to the toe end of the evacuation slide, the first rail including a first longitudinal tube, a second longitudinal tube, and a transverse tube extending between the first longitudinal tube and the second longitudinal tube.

3. The evacuation slide of claim 2, wherein the extendable dropdown volume is located in an interior of the transverse tube, when the extendable dropdown volume is in the stowed position.

4. The evacuation slide of claim 3, wherein the extendable dropdown volume comprises an inflatable pillow configured to extend from a ground interface surface of the transverse tube.

5. The evacuation slide of claim 1, further including:
    a first rail extending from the head end to the toe end of the evacuation slide; and
    a second rail configured to be oriented toward an exit surface, when the evacuation slide is in a deployed position, wherein the extendable dropdown volume extends from a toe of the second rail.

6. The evacuation slide of claim 5, wherein the extendable dropdown volume comprises at least one of an inflatable pillow or a U-shaped support.

7. The evacuation slide of claim 5, wherein a toe portion of the first rail is located between the extendable dropdown volume and the toe end of the evacuation slide.

8. The evacuation slide of claim 1, further comprising:
    a lace configured to secure the extendable dropdown volume in the stowed position; and
    a measurement device in operable communication with the lace.

9. The evacuation slide of claim 8, further comprising a pin located through a loop formed by the lace, wherein the measurement device comprises a load and a chord operably coupled to the pin and the load.

10. The evacuation slide of claim 8, wherein the measurement device comprises a height sensor and an electromechanical actuator, the electromechanical actuator being in operable communication with the lace and a controller of the height sensor.

11. An evacuation system comprising:
a compressed fluid source; and
an evacuation slide fluidly coupled to the compressed fluid source, the evacuation slide comprising:
a sliding surface extending from a head end to a toe end of the evacuation slide;
a rail extending from the head end to the toe end of the evacuation slide, the rail including a first longitudinal tube, a second longitudinal tube, and a transverse tube extending between the first longitudinal tube and the second longitudinal tube; and
an extendable dropdown volume configured to increase a height of the sliding surface at the toe end of the evacuation slide, wherein the extendable dropdown volume is configured to remain in a stowed position at a first sill height and deploy at a second sill height greater than the first sill height, and wherein the extendable dropdown volume is located in an interior of transverse tube, when the extendable dropdown volume is in the stowed position.

12. The evacuation system of claim 11, further comprising a lace configured to secure a first segment of the transverse tube to a second segment of the transverse tube.

13. The evacuation system of claim 12, further comprising a measurement device in operable communication with the lace, wherein the measurement device is configured to determine at least one of an aircraft sill height, an aircraft pitch angle, an aircraft roll angle, or an angle of the sliding surface relative to vertical.

14. The evacuation system of claim 13, further comprising a pin located through a loop formed by the lace, wherein the measurement device is configured to translate the pin out the loop.

15. An evacuation slide, comprising:
a first rail extending from a head end to a toe end of the evacuation slide;
a second rail configured to be oriented toward an exit surface, when the evacuation slide is in a deployed position;
a sliding surface extending from the head end to the toe end of the evacuation slide; and
an extendable dropdown volume coupled to at least one of the first rail or the second rail, wherein the extendable dropdown volume is configured to increase a height of the sliding surface at the toe end of the evacuation slide without increasing a longitudinal length of the evacuation slide, and wherein the extendable dropdown volume is configured to remain in a stowed position at a first sill height and to deploy at a second sill height greater than the first sill height.

16. The evacuation slide of claim 15, further comprising a measurement device in operable communication with the extendable dropdown volume, wherein the measurement device is configured to determine at least one of an aircraft sill height, an aircraft pitch angle, an aircraft roll angle, or an angle of the sliding surface relative to vertical.

17. The evacuation slide of claim 16, further comprising a lace configured to secure the extendable dropdown volume in the stowed position, wherein the measurement device is configured to release the lace.

18. The evacuation slide claim 15, wherein the first rail comprises a first longitudinal tube, a second longitudinal tube, and a transverse tube extending between the first longitudinal tube and the second longitudinal tube, and wherein the extendable dropdown volume is configured to increase a diameter of the transverse tube.

* * * * *